(12) United States Patent
Scholey et al.

(10) Patent No.: US 10,592,847 B2
(45) Date of Patent: Mar. 17, 2020

(54) METHOD AND SYSTEM TO SUPPORT ORDER COLLECTION USING A GEO-FENCE

(71) Applicant: Walmart Apollo, LLC, Bentonville, AR (US)

(72) Inventors: Abby Scholey, Leeds (GB); Joseph Sutton, Leeds (GB); Neha Rastogi, Bentonville, AR (US); Andre Oriani, Bentonville, AR (US); Alexandre De Souza Gois, Bentonville, AR (US); Brendan Wright, Bentonville, AR (US); Robb Albright, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 549 days.

(21) Appl. No.: 15/364,562

(22) Filed: Nov. 30, 2016

(65) Prior Publication Data

US 2017/0161678 A1    Jun. 8, 2017

Related U.S. Application Data

(60) Provisional application No. 62/262,079, filed on Dec. 2, 2015.

(51) Int. Cl.
*G06Q 10/08* (2012.01)
*G06Q 30/06* (2012.01)
*H04W 4/021* (2018.01)

(52) U.S. Cl.
CPC ..... *G06Q 10/0833* (2013.01); *G06Q 10/0836* (2013.01); *G06Q 30/0633* (2013.01); *H04W 4/021* (2013.01)

(58) Field of Classification Search
None
See application file for complete search history.

(56) References Cited

U.S. PATENT DOCUMENTS

| 7,054,832 | B1 | 5/2006 | Vallabh |
| 8,798,646 | B1 | 8/2014 | Wang et al. |
| 9,307,359 | B2 * | 4/2016 | Cheung ............... H04W 4/021 |
| 2007/0210936 | A1 | 9/2007 | Nicholson |

(Continued)

FOREIGN PATENT DOCUMENTS

| JP | 2002358578 A | 12/2002 |
| WO | 2007041672 A2 | 4/2007 |

OTHER PUBLICATIONS

International Search Report & Written Opinion in PCT/GB15/53273, dated Dec. 22, 2015; 9 pages.

(Continued)

*Primary Examiner* — Fateh M Obaid
(74) *Attorney, Agent, or Firm* — Schmeiser, Olsen & Watts LLP

(57) ABSTRACT

A customer electronic device places a goods order via a computer network including indicating an intended collection location, and in response installs a geo-fence function. The device triggers the geo-fence when proximate to the intended collection location. The computer network receives the trigger message and generates a pre-alert message sent to at least one in-store device, thereby prompting the ordered goods to be made ready for collection by the customer.

20 Claims, 5 Drawing Sheets

(56) References Cited

U.S. PATENT DOCUMENTS

| | | | |
|---|---|---|---|
| 2009/0182499 A1* | 7/2009 | Bravo | G01C 21/20 701/408 |
| 2012/0022883 A1 | 1/2012 | Morrison | |
| 2012/0072311 A1 | 3/2012 | Khan | |
| 2013/0103539 A1* | 4/2013 | Abraham | G06Q 30/0633 705/26.8 |
| 2013/0110678 A1* | 5/2013 | Vigier | G06Q 30/06 705/26.61 |
| 2013/0178233 A1* | 7/2013 | McCoy | H04W 4/021 455/456.3 |
| 2013/0226651 A1 | 8/2013 | Napper | |
| 2014/0058893 A1 | 2/2014 | Cazanas et al. | |
| 2014/0143060 A1 | 5/2014 | Fernandez | |
| 2014/0167961 A1* | 6/2014 | Finlow-Bates | H04W 4/021 340/541 |
| 2014/0249938 A1 | 9/2014 | Garrett et al. | |
| 2014/0279269 A1 | 9/2014 | Brantley et al. | |
| 2014/0279294 A1 | 9/2014 | Field-Darragh et al. | |
| 2014/0279458 A1* | 9/2014 | Holman | G06Q 20/227 705/40 |
| 2014/0370910 A1* | 12/2014 | Natucci, Jr. | H04W 4/029 455/456.1 |
| 2015/0039461 A1 | 2/2015 | Gadre et al. | |
| 2015/0073980 A1 | 3/2015 | Griffin et al. | |
| 2015/0120509 A1 | 4/2015 | Moring et al. | |
| 2015/0341747 A1* | 11/2015 | Barrand | G06Q 30/0201 455/405 |
| 2016/0012516 A1* | 1/2016 | Croy | G06Q 30/0603 705/26.9 |
| 2016/0132707 A1 | 5/2016 | Lindbo et al. | |

OTHER PUBLICATIONS

Combined Search and Abbreviated Examination Report in counterpart UK Patent Application No. 1620396.0, dated Apr. 28, 2017; 7 pages.

Search and Examination Report in U.K. Patent Application No. GB1620396.0 dated Jul. 16, 2018; 11 pages.

Examination Report in U.K. Patent Application No. GB1620396.0 dated Apr. 10, 2018; 7 pages.

Girish, Devika "Beacons vs Geofencing: Which Location-Aware Technology Should Your Business Use?" BeaconStac.com, Sep. 29, 2015.

Non-Final Office Action in U.S. Appl. No. 15/519,967 dated Mar. 1, 2019; 28 pages.

Final Office Action in U.S. Appl. No. 15/519,967, dated Aug. 14, 2019; 17 pages.

* cited by examiner

METHOD AND SYSTEM TO SUPPORT ORDER COLLECTION USING A GEO-FENCE

RELATED APPLICATIONS

This application claims the benefit of U.S. Provisional Patent No. 62/262,079, filed Dec. 2, 2015, the contents of which are incorporated herein in its entirety.

BACKGROUND

Technical Field

The present application relates in general to systems and methods which use a geo-fence for supporting operations in environments such as in a retail store. In particular, examples relate to an apparatus and a method which use a geo-fence to assist with order collection in a retail store.

Description of Related Art

Traditionally, a customer gathers a basket or shopping cart holding goods for purchase in a retail store and then pays for those goods at a point of sale terminal or checkout. Increasingly, modern retailers provide facilities which allow a customer to order goods remotely, such as over the Internet, so that the customer does not have to be present at a store in order to purchase goods of interest. In some instances, the remotely ordered items are delivered directly to the customer's home. However, in other instances, customers may instead wish to collect the remotely ordered items from a retail store, or other a suitable collection point. Furthermore, the long opening hours and convenient locations of modern retail stores, or like collection points, can make a collection of goods preferable to relying on delivery services.

Modern retail stores offer a diverse selection of goods, including foodstuffs, electronics goods, clothing, home and kitchen goods, and so on. For some time, customers have been able to remotely order many types of non-perishable goods (e.g. electronics goods or clothing). More recently, the online ordering facility has been extended to encompass other types of perishable goods (e.g. fresh foodstuffs).

In the case of electronics goods, clothing, home and kitchen goods and the like, the remotely ordered items typically are held within an operational area, such as a warehouse, where they may reside until needed in order to fulfill a customer order. In other cases, such as perishables such as foodstuffs, the goods may need to be gathered from special storage areas (e.g. refrigerated or frozen storage), or from display units which may be within a sales area of the store. In either case, collating the desired basket of ordered goods may take a non-trivial amount of time, and a customer arriving at a retail store to collect their order may be inconvenienced as a consequence.

In one example system, customers may be given a specific collection time, or time window, and the order is prepared in advance of the expected collection time. However, such a system lacks flexibility and may be inconvenient to the customer. Notably, the collection point may need to serve large numbers of customers quickly and efficiently. In some examples, the collection point may only have a limited capacity for appropriate storage of goods to be collected, and it may be desirable to make more efficient use of that storage capacity. In some examples, having brought together the relevant basket of goods from different areas (e.g. warehouse, clothing, cold storage, frozen storage), there may then be a time limit on storing those goods in a staging area waiting for collection by the customer.

It is an aim of some examples to address at least some of the above difficulties, or other difficulties which will be appreciated from the description herein. It is a further aim to provide a more efficient and cost effective apparatus and method which improves operational support in a retail store or similar environment.

SUMMARY

According to aspects of the present inventive concepts there is provided an apparatus and method as set forth in the appended claims. Other features of the inventive concepts will be apparent from the dependent claims, and the description which follows.

In one example there is described a system to support order collection using a geo-fence, comprising: an electronic device configured to place an order for goods, identify and store an intended collection location, form a geo-fence having a relationship with the intended collection location in response to placing the order, monitor the geo-fence and trigger the geo-fence in response to the electronic device becoming proximate to a geographic location of the intended collection location, and generate a trigger message responsive to triggering of the geo-fence; a computer network configured to receive the order for goods from the electronic device and to store order details in an order database including the intended collection location, and further configured to receive the trigger message from the electronic device responsive to the geo-fence being triggered on the electronic device, and configured to generate a pre-alert message responsive to receiving the trigger message; and at least one in-store device in communication with the computer network and configured to receive the order details of the order database from the computer network, configured to receive the pre-alert message from the computer network, and configured to display the order details responsive to receiving the pre-alert message.

In one example, the electronic device is configured to place the order for goods using an order collection application originated from the computer network. In one example, the electronic device is configured to install the geo-fence initially in a dormant state and to wake the geo-fence at a later time. In one example, the order is associated with an intended pick-up time and the electronic device is configured to activate monitoring of the geo-fence at a predetermined interval in advance of the intended pick-up time. In one example, the electronic device is configured to wake the geo-fence by generating a wake-up alarm.

In one example, the electronic device is configured to perform an order revalidation process in response to triggering the geo-fence, to confirm that order information held by the electronic device is consistent with the order details stored in the order database. In one example, the electronic device is configured to retain the order information responsive to placing the order, the order information including at least order identity information and the intended collection location, configured to compare the order information retained in the electronic device against corresponding information in the order details received from the computer network, and configured to send the trigger message to the computer network only in response to a positive completion of the order revalidation process.

In one example, the electronic device is configured to operate in a silent mode without outputting a notification locally at the electronic device that the geo-fence has been triggered.

In one example, the electronic device is configured to output a notification locally at the electronic device that the geo-fence has been triggered. In one example, the electronic device is further configured to receive an input as a deferral duration indicating a time period in the future for collection of the order. In one example, the electronic device is configured to send an indication of the deferral duration to the computer network. In one example, the computer network is configured to wait for the deferral duration before transmitting the pre-alert message to the at least one in-store device.

In one example, the computer network is coupled to a plurality of the in-store devices, and wherein the computer network is configured to select one or more in-store devices amongst the plurality of in-store devices and to send the order information only to the selected one or more in-store devices, based on the order details.

In one example, there is described an electronic device comprising: a communication unit arranged to communicate over a communication network with a computer network; a memory arranged to store an order collection application; a processor configured to execute the order collection application; wherein responsive to executing the order collection application the electronic device is configured to place an order for goods, identify and store an intended collection location, form a geo-fence having a relationship with the intended collection location in response to placing the order, monitor the geo-fence and trigger the geo-fence in response to the electronic device becoming proximate to a geographic location of the intended collection location, and generate a trigger message responsive to triggering of the geo-fence.

In one example, the electronic device is further configured to install the geo-fence initially in a dormant state and to wake the geo-fence at a later time using a wake-up alarm.

In one example, the order is associated with an intended pick-up time and the electronic device is configured to activate monitoring of the geo-fence at a predetermined period in advance of the intended pick-up time.

In one example, the electronic device is configured to perform an order revalidation process in response to triggering the geo-fence, to confirm that order information held by the electronic device is consistent with the order details stored in the order database, wherein the electronic device is configured to retain the order information responsive to placing the order, the order information including at least order identity information and the intended collection location, configured to compare the order information retained in the electronic device against corresponding information in the order details received from the computer network, and configured to send the trigger message to the computer network only in response to a positive completion of the order revalidation process.

In one example, there is described a method to support order collection using a geo-fence comprising: providing an order collection application to be installed on a customer electronic device, wherein responsive to executing the order collection application the electronic device is configured to place an order for goods, identify and store an intended collection location, form a geo-fence having a relationship with the intended collection location in response to placing the order, monitor the geo-fence and trigger the geo-fence in response to the electronic device becoming proximate to a geographic location of the intended collection location, and generate a trigger message responsive to triggering of the geo-fence; receiving, by the computer network, the order for goods from the electronic device and storing order details in an order database; receiving, by the computer network, the trigger message from the electronic device responsive to the geo-fence being triggered on the electronic device and generating a pre-alert message responsive to receiving the trigger message; receiving, by the at least one in-store device, the pre-alert message from the computer network; and outputting, by the at least one in-store device, a pre-alert notification responsive to receiving the pre-alert message from the computer network.

In one example the method includes: installing the geo-fence at the electronic device initially in a dormant state; setting a wake-up alarm on the electronic device consistent with an intended pickup-time associated with the order; and activating the geo-fence on the electronic device in response to the wake-up alarm.

In one example the method includes: performing an order revalidation process in response to triggering the geo-fence, to confirm that order information held by the electronic device is consistent with the order details stored in the order database; and sending the trigger message to the computer network only in response to a positive completion of the order revalidation process.

In one example the method includes: receiving at least one of a modification of a collection location or an intended pickup time in the order details held on the order database from a device other than the electronic device; performing an order revalidation process by confirming that at least one of the intended collection location and an intended pick-up time of the order retained by the electronic device are consistent with the collection location or the intended pick-up time held in the order database; and suppressing the trigger message in response to a negative completion of the order revalidation process.

In one example the method includes: operating the electronic device in a silent mode without outputting a notification locally at the electronic device that the geo-fence has been triggered.

In one example the method includes: sending the order details from the computer network to the at least one in-store device, and displaying the order details by the at least one in-store device in response to receiving the pre-alert message.

BRIEF DESCRIPTION OF THE DRAWINGS

The above and further advantages may be better understood by referring to the following description in conjunction with the accompanying drawings, in which like numerals indicate like structural elements and features in various figures. The drawings are not necessarily to scale, emphasis instead being placed upon illustrating the principles of the concepts. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DETAILED DESCRIPTION

At least some of the following exemplary embodiments provide an improved system and method suitable for supporting an order collection function, such as in a retail store or other collection facility. Many other advantages and improvements will be discussed in more detail below, or will be appreciated by the skilled person from carrying out exemplary embodiments based on the teachings herein. The exemplary embodiments have been described particularly in relation to a retail store such as a supermarket or general store for grocery and household items. However, it will be appreciated that the example embodiments may be applied in many other specific environments.

Figure 1:
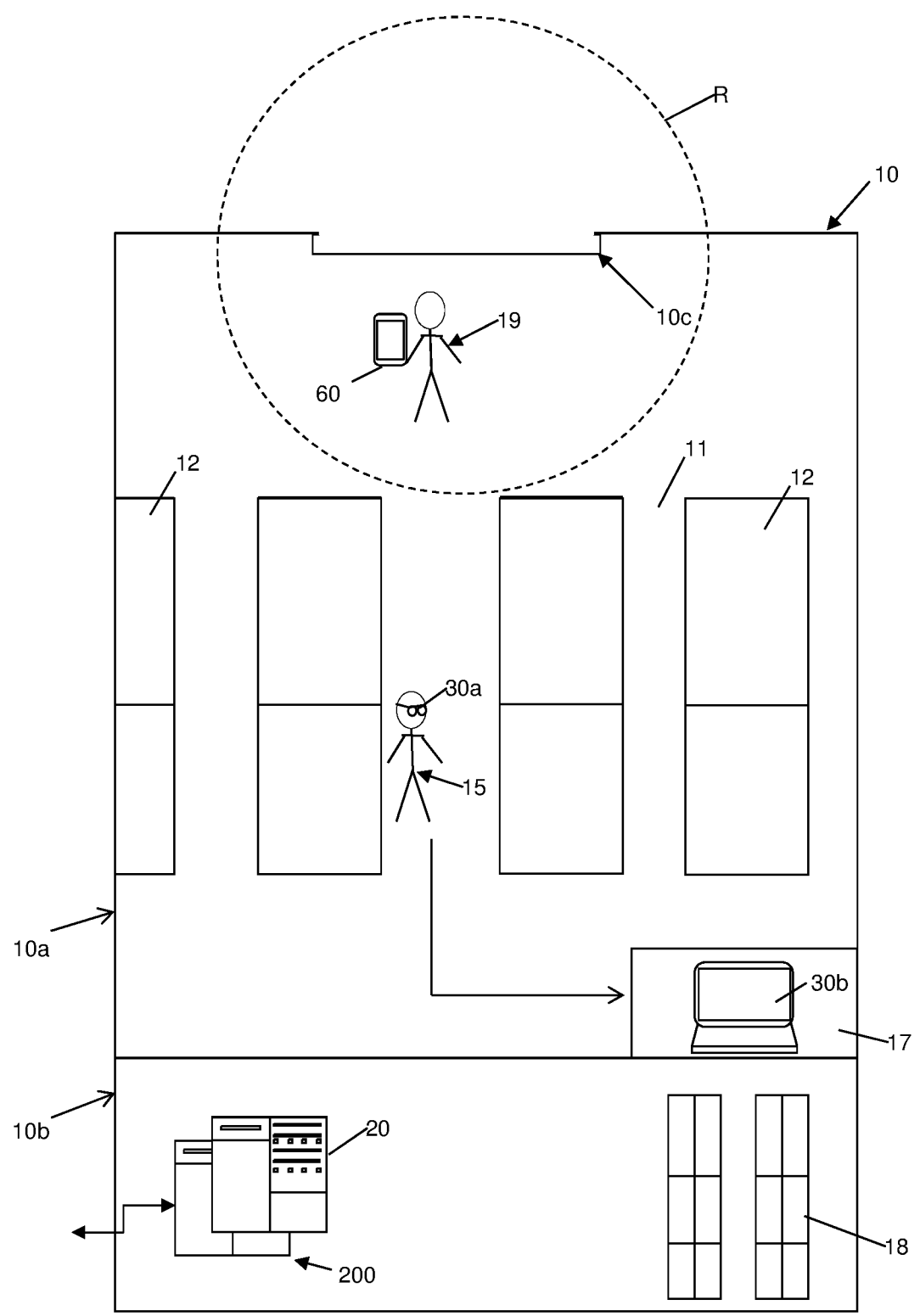
FIG. 1 is a schematic view of an example physical environment in which the described embodiments may operate.

FIG. 1 shows a schematic view of a physical environment in which an exemplary embodiment of the system may operate. The physical environment may comprise a retail store 10. The retail store 10 typically comprises a sales area 10a, in which goods are displayed. The sales area 10a typically includes a plurality of aisles 11, wherein each aisle further comprises a plurality of display units 12. In this example, the store 10 also comprises an operational area 10b, in which further stock may be held, and in which support infrastructure may be installed. Many other specific layouts and arrangements will be apparent to the skilled person, and may equally apply.

In this example, the sales area 10a of the retail store 10 further includes an entrance area 10c, such as a doorway through which customers 19 enter the store 10. In one example, it is desired to detect one or more customer devices 60 which pass within a certain detection field R, which in one example lies proximate to the entrance area 10c. In some embodiments, the detection field R may include a geofence or other virtual boundary formed by one or more devices described herein. In a further example, the store 10 may have an adjacent parking area, and the detection field R may extend to detect an arrival of a customer in the parking area. In another example, the detection field R may extend beyond the store building and its environs, to further encompass an area extending, for example, several yards (several meters) or hundreds of yards (hundreds of meters) beyond the store 10.

Within the store 10, the operational area 10b may include one or more server computer devices 20, described in further detail below. A computer network 200 in practice may link stores, for example, many hundreds of stores, with various local servers linked to one or more central control computers operated by the retailer, e.g., in their head office or data processing centers. These central control servers may in turn communicate across suitable communication networks with computer systems of suppliers, customers, manufacturers, and/or other elements of a retail chain.

In this example, the operational area 10b may further comprise a product storage area 18 or similar marshalling area. In one example, the product storage area 18 may provide shelves, racking or other physical storage locations for goods corresponding to orders which have been placed in advance, ready for those goods to be collected.

In one example, the store 10 further comprises one or more in-store devices 30a, 30b, which may be configured to be operated by store staff 15. In one example, the in-store devices 30a, 30b (generally, 30) may comprise one or more fixed terminals situated at convenient points in the store 10. Particularly, the store 10 may comprise an order collection point 17, where customers may collect their ordered goods. The in-store devices 30b may include a set of terminals located at the order collection point 17. In another example, the in-store devices may additionally or instead comprise one or more portable or wearable in-store devices 30a, configured to be carried or worn by a member of staff 15. As described herein, a geo-fence may be formed about some or all of the order collection point 17, or a geo-fence may be formed to otherwise have a relationship with the order collection point 17 regardless of whether the geo-force is formed about the order collection point 17.

The store 10 may take various different specific configurations in practice. In one example, the store 10 may comprise the operational area 10b and the collection point 17, without also offering the sales area 10a. For example, the store 10 may be configured as a collection facility only, such as a drive-in pick-up facility tailored for persons arriving in a vehicle to collect an order. The store 10 may be located adjacent to or within another form of retail outlet, such as a petrol station (gas station) or restaurant, wherein the sales area 10a may be for other purposes. Hence, it will be appreciated that the examples herein may be considered both for persons who arrive in the vicinity of the store 10 by foot, or by vehicle, or by other transport.

Figure 2:
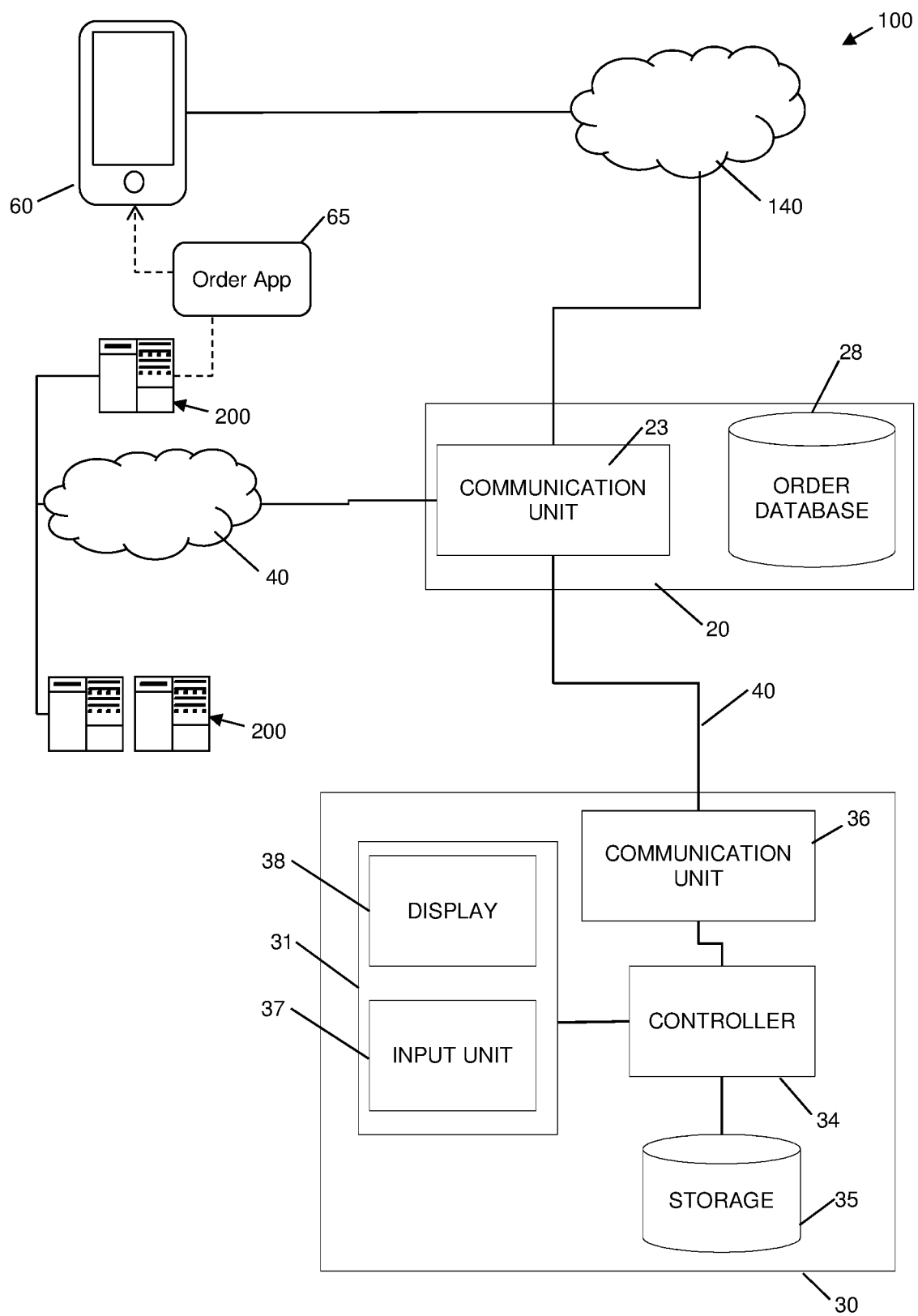
FIG. 2 is a schematic view of an example order collection system which may be used to support order collection using a geo-fence.

FIG. 2 is a schematic diagram showing an example order collection system 100. In one example, the system 100 includes a computer network 200 including at least one server 20, and at least one in-store device 30. The system 100 is configured to communicate with a plurality of customer devices 60. Additional detail on in-store devices 30 may be found in FIG. 1.

The server 20 and an in-store device 30 may be linked by a communication network 40, for example, an internal network. The internal network 40 may take any suitable form, including one or more wired and/or wireless communication links, as will be familiar to those skilled in the art. In one example, the server 20 may be located within the retail store 10, and may be connected to an in-store device 30 using a wired or wireless local area network (e.g. a WiFi network). In another example, the server 20 may be located off-site, e.g. in a central or regional data processing site operated by the retailer or some other remote location, and a network connection 41 between server 20 and the in-store devices 30 may include a wide area network, such as the Internet. Network connection 41 may be part of communications network 40.

In this example, the server 20 may further include a communication unit 23, e.g. including a network interface card, which is operable to manage communications over the network 40 by the server 20. The server communication unit 23 may also manage communication between the server 20 and one or more other servers of the network 200. Thus, the server 20 may be part of a corporate server network or back-end network. These other servers may be located in other stores, in other regional data processing sites or in a head office site.

In one example, the server 20 may include an order database 28, or may be communicatively coupled to the order database 28 provided on a suitable storage device such as a network attached storage (NAS). In some embodiments, the order database 28 is configured to store order information detailing orders placed in advance by customers for collection at the store 10. In particular, the order database 28 may relate user identity information (such as a 'user id' code or similar credentials) to one or more orders which have been placed by each customer. Each order may be identified, for example, by a unique order number. Each order may in turn define a list of one or more goods or product items which are identified by suitable codes (e.g. stock keeping unit codes or SKU codes). In one example, the order information and order details held in the order database 28 may be received from and regularly updated by a controlling server or related computer device at the head office site, via the server communication unit 23.

In one example, the in-store device 30 may comprise a controller 34, a storage device 35, a user interface (UI) module 31 and a communication unit 36. The user interface module 31 may include an input unit 37 and a display 38.

The controller 34 is operable to control the in-store device 30, and may take the form of a processor, e.g., a central processing unit (CPU). The storage device 35 may be a volatile or non-volatile storage device operable to store relevant data required for operation and control of the in-store device 30. The communication unit 36 may be operable to manage communications with the server 20 over the network 40.

The user interface module 31 is operable to input and output information to a user via one or more interfaces. In one exemplary embodiment the UI module 31 comprises an input unit 37 which is operable to receive instructions or commands from the user, and a display 38 which is operable to display at least one image to the user. The display 38 may be a screen which is integral to the in-store device 30, but it is not limited thereto. The input unit 37 may receive user input by means of a button, a touch-screen unit, voice activation, gesture recognition or any other suitable means for receiving user instructions. The input unit 37 may also be operable to receive user input from a combination of the foregoing and/or from other sources.

In one example, the in-store device 30 is a portable electronic device 30a as mentioned above. The portable electronic device 30a is constructed and intended to be carried by a user, and is configured to be operated while in the hands of the user. In a further example, the in-store device 30 is a wearable electronic device 30a. The wearable electronic device 30a is also portable, but is further designed to be worn by a user during operation of the device. Advantageously, a wearable device may be configured to leave the user's hands free to perform other tasks while operating the device. The wearable device 30a may be smart glasses such as Google Glass™ or related electronic device. In other examples, the wearable electronic device 30a may be configured as a pendant, a smart watch, or a hat. In yet further examples, the wearable electronic device 30a may be constructed as a patch or as a thin film incorporated in or attached to clothing, or any other piece of clothing or accessory which is adapted to incorporate technological elements. In an embodiment where the in-store device 30a is a pair of smart glasses, the display 38 may be a Heads-Up Display (HUD) or the like on the glass or a similar display projected into the field of view of the user.

In one example, one or more of the in-store devices 30 may be configured as a terminal 30b, such as personal computer, which may be fixedly positioned within the store 10. In one example, one or more such terminals 30b may be positioned at the order collection point 17 noted in FIG. 1.

In one example, the customer device 60 is operated by the customer. In one example, the customer device 60 is a smart phone, tablet or wearable electronic device that is used by the customer and routinely carried by a customer 19. The customer device 60 may further comprise software stored in a memory device of the customer device 60 and executed by a processor of the customer device 60, and configured to manage communications on a communication network 140, such as the Internet. In one example the software comprises an order collection application (app') 65 which may be downloaded from an app store, for example, from a website on the internet, and may be installed on the customer device 60.

During operation, the customer may place an order for goods, and indicate that the goods are to be collected from the store 10. The order may be placed in any suitable fashion. In one example, the customer 19 places the order electronically over the Internet. For example, the customer 19 may use a website on the World Wide Web to place the order, such as by using their customer device 60. In another example, the customer 19 may use the order collection application 65 to place the order over the Internet. In a further example, the customer 19 may use an electronic order point located in the retail store 10 to place the order for collection at a later time. In a still further example, the customer 19 may place an order over the telephone for later collection.

In one example, order information generated in response to the order is received by the computer system 200, for example, a head office server or a server of the system 200 in a central or regional data processing site operated by the retailer, or some other remote computer. The order information is added to the order database 28 accessible to the relevant store server 20 of the store 10 where the customer 19 intends to collect the ordered goods. For example, the order information is received by the communication unit 23, and stored in the order database 28.

The order information includes details of the goods which have been ordered. The order information may also include any other relevant order metadata, such as an order ID number and/or a customer ID number. In one example, the order information may include an approximate collection time and/or details of the customer 19 for use in the verification of the customer's identity upon collection.

Subsequently, the customer 19 may arrive at the store 10 to collect the goods which have been ordered. In this example, the customer 19 may carry the customer device 60 on the customer's journey toward the store 10 and on arrival at the store 10.

Figure 3:
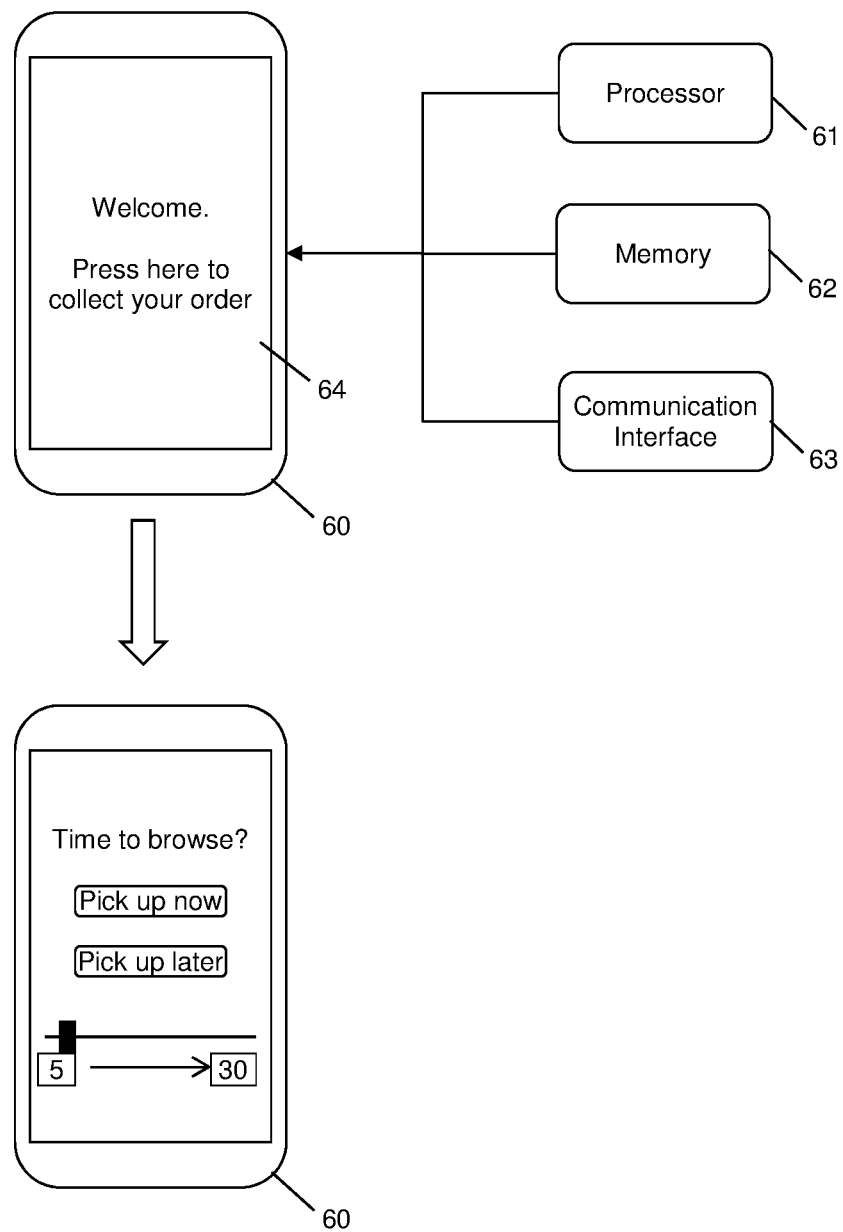
FIG. 3 is a schematic view of an example customer electronic device configured for use with the order collection system.

FIG. 3 is a schematic view of an example customer electronic device 60 configured for use with the order collection system. In particular, FIG. 3 shows an example of the customer device 60 in more detail. The customer device 60 may include a processor 61 and a memory 62 of a type that will be familiar to those of ordinary skill in the art. The customer device 60 may include a communication unit 63 which is capable of communicating with the system 100, such as a WiFi interface or the like. The customer device 60 may also have a display unit 64, such as a display screen for displaying text, graphics, and so on. In operation, the customer device 60 may exchange messages with and/or may communicate with the server 20, e.g. via a local WiFi network or other wireless communication network. In some examples, communications with the customer device 60 may occur partially over a wide area cellular network connection and may continue partially by using an in-store WiFi network, e.g., to continue communication when the user arrives and moves into the store).

In one example, the display screen 64 is controlled by the order collection application 65 operating on the device 60. The customer device 60 may display a notification for the user to confirm that the order collection function is operating correctly, i.e. that the user has been recognised by the system 100 as being in proximity to the store 10. For example the customer device 60 may be prompted to display of a message at the display 64 such as "Welcome to the store. Are you here to collect an order?" The customer device 60 may be operated to confirm that the user wishes to proceed with the order collection at this time. The customer device 60 may further allow the user to input a deferral request, in this example in the form of a slider allowing deferral of between 5 and 30 minutes from the present time. Further messages may be exchanged with the customer device 60, such as to remind to customer of an indicated collection time or to inform the customer of progress concerning the order. In a further example, the order collection application runs in the background on the customer device 60 and may automatically transmit messages to the system 200 without requiring further user input.

Figure 4:
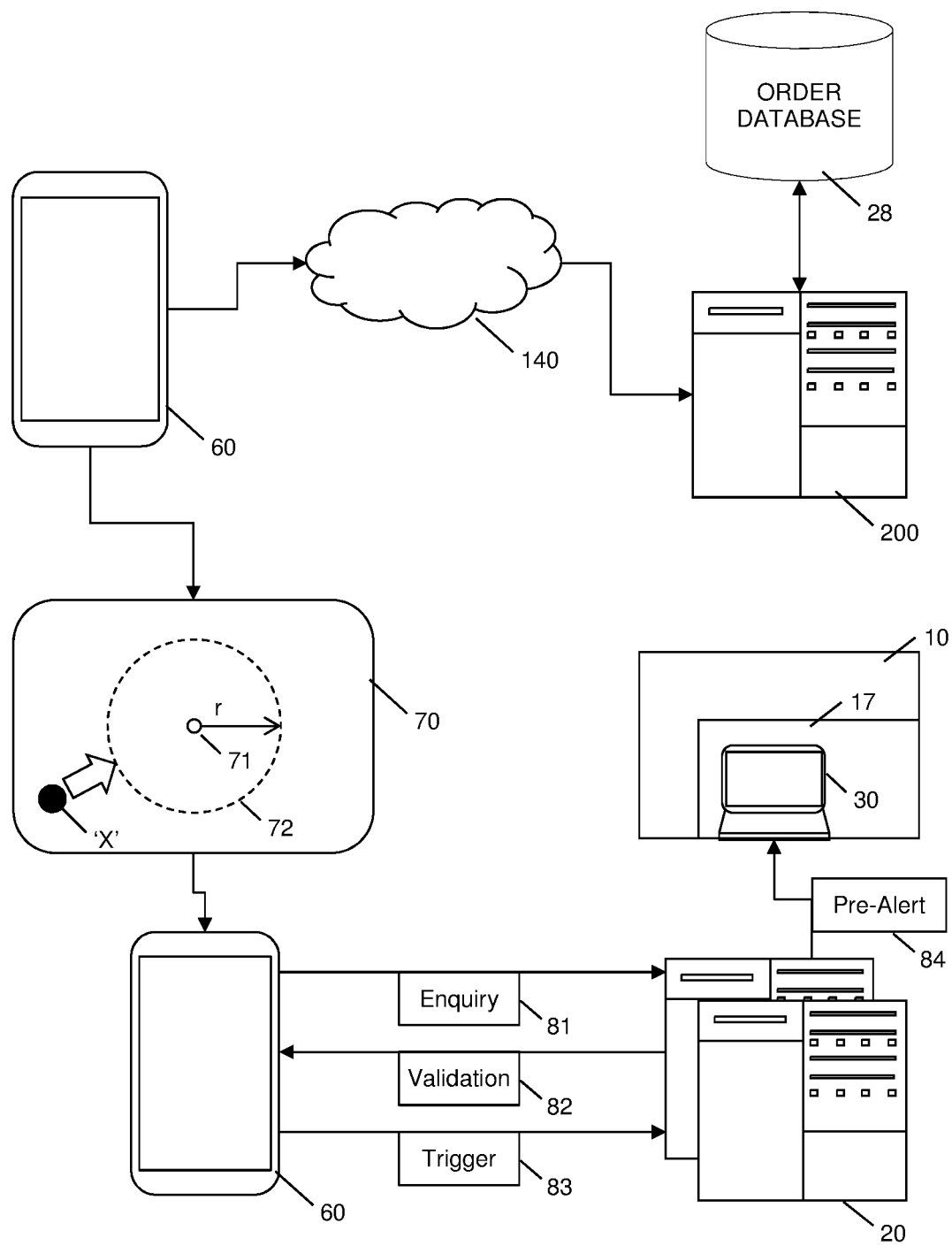
FIG. 4 is a schematic view of the example order collection system in use.

FIG. 4 is a further schematic view of the example order collection system 100. In this example, the customer device 60 is used to place an order, such as over the Internet or similar wide area network 140, with the order processing system 200 of the retailer. As noted above with respect to some embodiments, in practice the order processing system 200 may comprise a large network of computers and computer systems suitable to support retailing on a national or an international scale. The system 200 suitably includes the order database 28, upon which are recorded details of orders from each customer device. In a practical example, the system 200 may be configured to process many thousands, or tens of thousands, of orders per day, for collection at any of tens, hundreds of even thousands of individual stores 10, and not limited thereto. Notably, such a system operating at scale brings many difficulties.

In this example, each customer device 60 may be used to browse and select the desired basket of goods, such as via an online store portal. For a grocery retailer, that basket typically comprises between 10 and 100 individual items, which brings challenges in terms of gathering together multiple items at the appropriate time ready for collection by the relevant customer, as already discussed above. Conveniently, when placing the order, the customer device 60 is operated to indicate a preferred collection location, which may be associated with the site of a particular store 10, and a preferred collection time or time window. As discussed above, example embodiments consider the situation particularly where the collection point 17 is located within or adjacent to a retail store 10 that also offers goods for sale in a sales area 10a, which brings efficiencies in terms of stocking and picking the relevant ordered goods for the customer. However, in other examples the collection point 17 may be in a store 10 and is dedicated solely to the purposes of collecting goods.

In one example, the system is can install or create a geo-fence function 70 at the customer device 60. In one example, the geo-fence function 70 is installed on the customer device 60 responsive to placing the order with the ordering system 200. That is, the process of placing the order with the ordering system then triggers the customer device 60 to create the geo-fence thereon.

In another example, a geo-fence is created at the customer device 60 subsequently, at some time between the time when the order was made on the system 200 and the intended collection time or time window. In one example, the system 200 is configured to actively push a notification to the customer device 60 and, in response, the customer device 60 then creates the geo-fence.

In one example, the geo-fence may be created on the customer device 60, but is left initially in a dormant state, for example, inactivated. The created geo-fence is activated at a suitable later point in time, which is conveniently consistent with the intended pick up time for the order. In this way, the geo-fence can be installed and created at a time when connectivity with the customer device 60 has already been established, i.e. during the order placement process. However, the created geo-fence then remains dormant until the time when it is needed, for example, some hours or days later at which time that electronic device can activate or wake the geo-fence. In particular, actively monitoring a geo-fence may cause a relatively high workload within the customer device 60 and in consequence may drain battery life significantly. Therefore, minimizing the period when the geo-fence is active helps to preserve battery life within the customer device 60.

In one example, the customer device 60 is configured to set or generate a wake up alarm. In one example, the wake up alarm is configured to activate relevant geo-fence functions on the customer device 60, for example, geo-fence function 70 described with reference to FIG. 4, at a predetermined period prior to the indicated pick up time, such as one hour prior to the intended pick up time. Monitoring an alarm on a customer device 60 typically is less costly than monitoring a geo-fence. Thus, the wake-up alarm assists in minimizing processing costs on the customer device 60 and in turn preserving battery life.

In one example, the customer device 60 is configured to selectively determine whether or not to install the geo-fence. In one example, a selection may be made based on a form factor of the customer device 60. The customer device 60 is configured to determine its own form factor, and may then activate a geo-fence only for certain predetermined hardware form factors. In one example, the application ('app') operating on the customer device 60 may establish a device type, such as by receiving device information from an underlying operating system. Typically, the same app may be installed on a plurality of different devices (e.g. devices running Android® or iOS® operating systems) and hence be installed on smartphones, tablets, set-top boxes, laptops and other form factors. However, in practice customer behaviour differs in using such devices. Typically, only a highly mobile device such as a smart phone tends to be carried by the customer when making a collection of goods. In this way, the system may take advantage of real-world customer behaviours, by selectively determining to activate the geofence only when the device hardware is of a certain type, leading to more efficient operation of the system. In particular, devices which are unlikely to be carried by the customer to the store 10 when making a goods collection are not burdened by unnecessarily monitoring the geo-fence.

In one example, a geo-fence is created, configured, and/or installed by defining a geographic location point, for example by latitude and longitude coordinates. Suitably, the geo-fence is consistent with the indicated collection location as established when placing the order. The geo-fence may be configured as a radius around the indicated location point. Other examples are of course possible, such as a regular rectangle, or an irregularly shaped geo-fence defined by appropriate physical or virtual boundaries, or a partial radius perimeter about the indicated location point. A geo-fence may be formed by one or more different devices, for example, devices providing WiFi, GPS, Bluetooth™, and so on.

FIG. 4 includes a schematic illustration of an example geo-fence function 70 for convenience of explanation. In this example, the collection location is indicated by a point location 71 and a radius 'r', such as 100, 200 or 500 yards (or, equivalently, 100, 200 or 500 meters) from that central point location, thereby defining a geo-fence boundary 72. The geo-fence function 70 when active determines a current location 'X' of the customer device 60 such as by using location services running on the customer device 60 in a manner which will be familiar to those still skilled in the art. For example, the current location is determined using a global positioning system (GPS), by considering the availability of a nearby WiFi system, the presence of certain locator beacons, and so on. The geo-fence function 70 thus may compare the current location of the customer device 60 and the geo-fence boundary 72. When the customer device 60 crosses the boundary 72, in other words breaks or intersects the geo-fence 72 as represented schematically by the block arrow in FIG. 4, then the geo-fence function 70 is triggered.

Suitably, the customer device 60 is configured to respond to triggering of the geo-fence 70. In one example, the customer device 60 is configured to initiate a communication with the order purchasing system 200, for example, via communication network 140, in response to the geo-fence 70 being triggered.

In one example, the customer device performs an order revalidation process, for example, to confirm that order information, for example, held by the customer device 60, is consistent with the order details stored in the order database 28. In particular, the customer device 60 may send an enquiry message 81, suitably comprising the order identity ('OID') of a current order, to the order processing system 200, here represented by the one or more servers 20. In one example, the order identity information is stored on the customer device 60. For example, the customer may have originally placed the order using the customer device 60, and the order identity information is saved on the device 60 from that time by the order collection application. In a further example, the order identity information may be manually entered by the customer 19 into the customer device 60. For example, if the order has been placed in the retail store 10, e.g. at an electronic order point, the customer 19 may receive a printout which details the order identity information which is then transferred manually into the customer device 60. Alternatively, the printout may comprise a machine-readable printed code (e.g. a barcode, QR code, and so on) which can be scanned and interpreted by an image capture element such as a camera of the customer device 60.

The order processing system 200 may send a validation message 82 to the customer device 60, for example, by a hardware processor that executes data for generating and sending the validation message 82. The validation message 82 contains information which permits the customer device 60 to confirm that the order information stored by the customer device 60 is still valid. The order details sent by the system 200 may be taken from the order database 28. Notably, in some examples, the customer may change an order after the order has been initially lodged with the order processing system 200. For example, the customer may change the desired pick up location and/or may change the desired pick up time. Further, it is possible that the customer may access the order processing system 200 from a plurality of different devices, such as a mobile phone, smartphone, or other handheld electronic device, from a tablet, from a desktop computer and so on. An order may be initially lodged by one device, and then subsequently modified using another device. Also, it is possible that the customer device 60, upon which the geo-fence 70 has been installed, has not previously been notified of these changes.

Conveniently, the customer device 60 is configured to validate the stored order information against the information received in the validation message 82, which confirms that the order details held by the customer device 60 are still valid. In one example, where the stored order details are determined to be invalid then no further action is taken and the process simply ends at that point. That is, a negative outcome may result in a trigger message being suppressed in a suitable way, such as by the message not being generated or by the message being discarded. As another option, order details recorded in the customer device 60 can be updated as appropriate, for example by setting a new intended pick up time, or a new pick up location. Notably, checking validity of the order avoids a false positive alert being sent through the system. Further, this process is relatively lightweight for the system 200. For example, the validation process, being distributed and performed mostly at the customer device 60, can now be implemented relatively quickly and without adding onerous processing overhead at the system 200.

In one example, the customer device 60 can be configured to send a trigger message 83 to reach to the system 200, as a form of alert notification. The trigger message 83 notifies the server 20 that the customer device 60 has entered the vicinity of the collection location, in this example by triggering the geo-fence boundary 72. In one example, the trigger message 83 is sent only in response to a positive outcome of the order revalidation process.

The server 20 may be configured to cause a pre-alert information message 84 to be sent to one or more in-store devices 30. The in-store device 30 are suitably used by staff in the store 10, i.e. at the collection point 17, in the manner already described above. In this way, the in-store devices 30 may output a pre-alert notification to the staff, warning of the imminent arrival of the customer who uses the customer device 60.

In one example where several in-store devices 30 are connected to the server 20, the server 20 may determine one or more appropriate in-store devices 30 to receive a pre-alert message. Referring to FIG. 2, the computer network 40 may include an order database 28. An in-store device 30 may receive a pre-alert message (described herein) from the computer network 40, and display order details responsive to receiving the pre-alert message, thereby prompting collation of the goods ready for collection The server 20 may select one or more recipient devices among a current population of in-store devices 30. In one example, the determination is made based on the order information. For example, an order comprising goods stored in the storage area 18, e.g. electronic goods or clothing, may be transmitted to an in-store device 30b (see FIG. 1) at an order collection point 17 proximate to the respective storage area 18. An order comprising goods which are located on display units 12 in the store, such as an order comprising foodstuffs or perishable goods may be instead or additionally transmitted to a portable or wearable in-store device 30a operated by a member of staff 15 located in the sales area 10a, and proximate to the ordered goods. Thus, the system may improve operational efficiency by appropriately directing the order information messages to the appropriate in-store devices according to criteria which may be applied appropriately for each respective customer order and collection instance.

In one example, an order collection team using a set of the in-store device 30 may be designated by the system 200 and may receive each a new pre-alert message. The in-store devices 30 operated by the order collection team may further update and display a list of current orders that are due to be collected (optionally alongside relevant time information such as a remaining time until collection). The system 200 may further support co-operative messaging amongst the in-store devices 30 such as by allowing one team member to signal that they are managing a certain order or have picked certain items for part of a certain order. In use, the one or more members of staff who receive the transmitted pre-alert message on the relevant in-store devices 30a, 30b may then gather the ordered items and, for example, convey the items to the order collection point 17 in one or more suitable bags, totes or carriers. The customer may then collect the ordered goods from the order collection point 17.

In one example, the system may operate to provide feedback at the customer device 60 during this pre-alert process, such as providing messages on the display 64 as mentioned above in FIG. 3. In another example, the system may operate silently, so that the customer is unaware that the alert message has been sent. In this way a customer who, for example, is driving to the collection point is not unduly distracted by operation of the customer device 60. This silent mode however still allows the system 200 to react in a timely manner to the imminent arrival of the customer at the collection point 17 of the store 10. In one example, the system is ideally suited for a drive-through type collection point where the customer drives to the collection point and the goods are then made ready for the user to collect and put immediately into a customer vehicle or other apparatus for transporting the goods.

Improving reactivity and reducing the waiting time for each customer in turn has benefits in terms of reducing congestion at the collection point. In one example, configuring the system with suitable operational parameters allows significant time savings and reduces the total time to collect an order to the order of less than five minutes, or even less than one minute in some cases.

Figure 5:
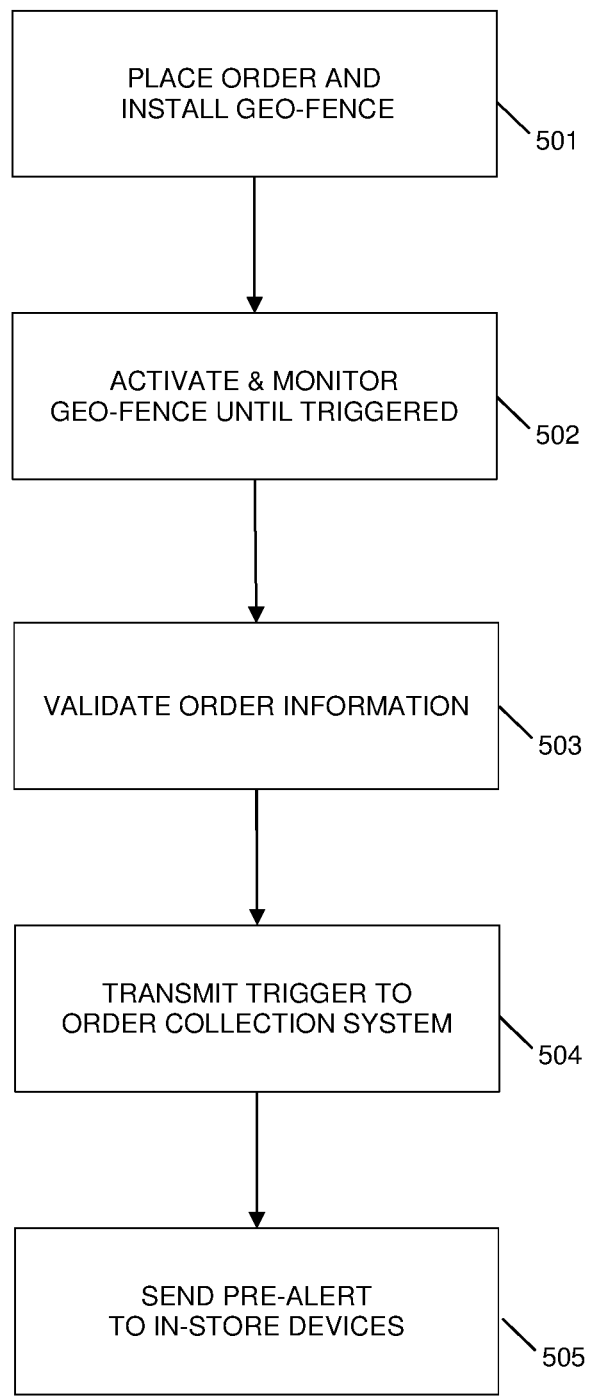
FIG. 5 is a flowchart of an example method which may be used to support order collection using a geo-fence.

FIG. 5 is a schematic flow chart of a further example method as considered herein. Some or all of the method can be performed at an electronic device of the retail store environment 10 of FIGS. 1-4. The method can be governed by instructions that are stored in a memory device of an electronic device, and executed by a hardware processor of the electronic device of FIGS. 1-4.

The method may include step 501 of placing an order for goods. This step may include, in response to placing the order, installing a geo-fence function at a client device, such as the customer device 60 discussed herein operating in combination with the order collection system 100 and the computer network 200. In some embodiments, the customer device 60 is configured to operate using an order collection application originated from the computer network, for example, by executing the order collection application. The geo-fence function may be stored in memory and executed by a processor of the customer device 60. For example, a geo-fence may be formed to be consistent with the intended collection location 17, or within in a predetermined distance from the collection location 17 in response to placing the order. Step 501 may include storing order information on the customer device 60. The stored order information may include one or more of: an order identity, an intended order collection location, and an intended order collection time.

The method may include step 502 of activating and monitoring the geo-fence function, which may occur at some time subsequently and may be triggered by a wake-up alarm on the customer device 60. Monitoring of the geo-fence may then continue until the geo-fence is triggered according to changes in location of the customer device 60. In one example, monitoring of the geo-fence may be cancelled by the device 60 upon reaching the intended order collection time, or upon reaching an end of an appropriate collection time window.

The method may include, in response to triggering of the geo-fence on the device 60, step 503 of revalidating the order information held by the customer device 60, in particular to confirm that the collection location and/or the collection time held at the customer device 60 are still valid. The step 503 may comprise retrieving order information from the order database 28 based on the received order identity information, and supplying the retrieved order information to the customer device 60.

The method may include step 504 of transmitting a trigger message from the customer device 60 to the server 20 of the order collection system 200, which may be response to the order validation of step 503. The method may include step 505 of sending a pre-alert message to one or more in-store devices 30, such as the wearable device 30a and/or the fixed terminal 30b described above. The step 505 may include displaying the order information on the in-store device 30, to pre-alert a store colleague or employee that the customer device 60 has entered the store 10, or its vicinity. In this way, the associated order can be made ready for collection. Further steps may be included in the method, as described herein, but not limited thereto.

The above-described systems and methods may advantageously allow a retail store to more effectively manage the collection of ordered goods. Particularly, the systems and methods provide a convenient system for alerting members of staff to the arrival of a customer wishing to collect an order. Consequently, the order can be prepared or made ready for collection in the time between the customer entering the store or its vicinity, and reaching the order collection point, thereby reducing customer waiting time and/or making more efficient use of the collection point.

The above described systems and methods take advantage of the increased availability of smart devices such as smart phones, tablets and wearable devices, by interacting with the devices to efficiently facilitate order collection. The above-described examples provide a simple and intuitive system which may be easily operated with minimal training by customers and store staff alike.

In the description herein, numerous specific details are set forth in order to provide a thorough understanding of the present disclosure. It will be apparent, however, to one having ordinary skill in the art that every such specific detail need not be employed to practice the present disclosure and that other embodiments are also possible. In other instances, well-known materials or methods have not been described in detail in order to avoid obscuring the present disclosure.

The features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Reference throughout this specification to "one embodiment", "an embodiment", "one example" or "an example" means that a particular feature, structure or characteristic described in connection with the embodiment or example may be included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture which implements the function or act specified in the flowchart and/or block diagram.

The example embodiments have been described with reference to the components, modules and units discussed herein, and such functional elements may be combined into fewer elements or separated into additional elements. Various combinations of optional features have been described herein, and it will be appreciated that described features may be combined in any suitable combination.

Although a few examples have been shown and described, it will be appreciated by those skilled in the art that various changes and modifications might be made without departing from the scope of the invention, as defined in the appended claims.

The invention claimed is:

1. A system to support order collection using a geo-fence, comprising:
   an electronic device configured to place an order for goods, identify and store an intended collection location, form a geo-fence having a relationship with the intended collection location in response to placing the order, monitor the geo-fence and trigger the geo-fence in response to the electronic device becoming proximate to a geographic location of the intended collection location, and generate a trigger message responsive to triggering of the geo-fence, wherein the electronic device is configured to output a notification locally at the electronic device that the geo-fence has been triggered and is further configured to receive an input as a deferral duration indicating a time period in the future for collection of the order;
   a computer network configured to receive the order for goods from the electronic device and to store order details in an order database including the intended collection location, and further configured to receive the trigger message from the electronic device responsive to the geo-fence being triggered on the electronic device, and configured to generate and output to an order collection application a pre-alert message that includes the trigger message and that indicates the electronic device is in a vicinity of the intended collection location and further indicating an imminent arrival of a user of the electronic device in view of the deferral duration; and
   at least one in-store device in communication with the computer network and configured to receive the order details of the order database from the computer network, configured to receive the pre-alert message from the computer network, and configured to display the order details responsive to receiving the pre-alert message.

2. The system of claim 1, wherein the electronic device is configured to place the order for goods using the order collection application originated from the computer network.

3. The system of claim 1, wherein the electronic device is configured to install the geo-fence initially in a dormant state and to wake the geo-fence at a later time.

4. The system of claim 3, wherein the order is associated with an intended pick-up time and the electronic device is configured to activate monitoring of the geo-fence at a predetermined interval in advance of the intended pick-up time.

5. The system of claim 3, wherein the electronic device is configured to wake the geo-fence by generating a wake-up alarm.

6. The system of claim 1, wherein the electronic device is configured to perform an order revalidation process in response to triggering the geo-fence, to confirm that order information held by the electronic device is consistent with the order details stored in the order database.

7. The system of claim 6, wherein the electronic device is configured to retain the order information responsive to placing the order, the order information including at least order identity information and the intended collection location, configured to compare the order information retained in the electronic device against corresponding information in the order details received from the computer network, and configured to send the trigger message to the computer network only in response to a positive completion of the order revalidation process.

8. The system of claim 1, wherein the electronic device is configured to operate in a silent mode without outputting a notification locally at the electronic device that the geo-fence has been triggered.

9. The system of claim 1, wherein the computer network is configured to wait for the deferral duration before transmitting the pre-alert message to the at least one in-store device.

10. The system of claim 1, wherein the computer network is coupled to a plurality of the in-store devices, and wherein the computer network is configured to select one or more in-store devices amongst the plurality of in-store devices and to send the order information only to the selected one or more in-store devices, based on the order details.

11. An electronic device, comprising:
a communication unit arranged to communicate over a communication network with a computer network;
a memory arranged to store an order collection application;
a processor configured to execute the order collection application;
wherein responsive to executing the order collection application the electronic device is configured to place an order for goods, identify and store an intended collection location, form a geo-fence having a relationship with the intended collection location in response to placing the order, monitor the geo-fence and trigger the geo-fence in response to the electronic device becoming proximate to a geographic location of the intended collection location, and generate a pre-alert message that includes a trigger message which is generated by the electronic device and output to an order collection application and that indicates the electronic device is in a vicinity of the intended collection location and further indicating an imminent arrival of a user of the electronic device in view of a deferral duration, wherein the electronic device is configured to receive an input as the deferral duration indicating a time period in the future for collection of the order.

12. The electronic device of claim 11, wherein the electronic device is further configured to install the geo-fence initially in a dormant state and to wake the geo-fence at a later time using a wake-up alarm.

13. The electronic device of claim 11, wherein the order is associated with an intended pick-up time and the electronic device is configured to activate monitoring of the geo-fence at a predetermined period in advance of the intended pick-up time.

14. The electronic device of claim 11, wherein the electronic device is configured to perform an order revalidation process in response to triggering the geo-fence, to confirm that order information held by the electronic device is consistent with the order details stored in the order database, wherein the electronic device is configured to retain the order information responsive to placing the order, the order information including at least order identity information and the intended collection location, configured to compare the order information retained in the electronic device against corresponding information in the order details received from the computer network, and configured to send the trigger message to the computer network only in response to a positive completion of the order revalidation process.

15. A method to support order collection using a geo-fence, comprising:
providing an order collection application to be installed on an electronic device, wherein responsive to executing the order collection application the electronic device is configured to place an order for goods, identify and store an intended collection location, form a geo-fence having a relationship with the intended collection location in response to placing the order, monitor the geo-fence and trigger the geo-fence in response to the electronic device becoming proximate to a geographic location of the intended collection location, and generate a trigger message responsive to triggering of the geo-fence;
outputting, by the electronic device, a notification locally at the electronic device that the geo-fence has been triggered and receiving an input as a deferral duration indicating a time period in the future for collection of the order;
receiving, by the computer network, the order for goods from the electronic device and storing order details in an order database;
receiving, by the computer network, the trigger message from the electronic device responsive to the geo-fence being triggered on the electronic device, generating and outputting to an order collection application a pre-alert message that includes the trigger message, and that indicates the electronic device is in a vicinity of the intended collection location and further indicating an imminent arrival of a user of the electronic device in view of the deferral duration;
receiving, by the at least one in-store device, the pre-alert message from the computer network; and
outputting, by the at least one in-store device, a pre-alert notification responsive to receiving the pre-alert message from the computer network.

16. The method of claim 15, further comprising:
installing the geo-fence at the electronic device initially in a dormant state;
setting a wake-up alarm on the electronic device consistent with an intended pickup-time associated with the order; and
activating the geo-fence on the electronic device in response to the wake-up alarm.

17. The method of claim 15, further comprising:
performing an order revalidation process in response to triggering the geo-fence, to confirm that order information held by the electronic device is consistent with the order details stored in the order database; and
sending the trigger message to the computer network only in response to a positive completion of the order revalidation process.

18. The method of claim 15, further comprising:
receiving at least one of a modification of a collection location or an intended pickup time in the order details held on the order database from a device other than the electronic device;
performing an order revalidation process by confirming that at least one of the intended collection location and an intended pick-up time of the order retained by the electronic device are consistent with the collection location or the intended pick-up time held in the order database; and suppressing the trigger message in response to a negative completion of the order revalidation process.

19. The method of claim 15, further comprising operating the electronic device in a silent mode without outputting a notification locally at the electronic device that the geo-fence has been triggered.

20. The method of claim 15, further comprising:
sending the order details from the computer network to the at least one in-store device; and
displaying the order details by the at least one in-store device in response to receiving the pre-alert message.

* * * * *